United States Patent [19]
Kinard et al.

[11] Patent Number: 6,162,345
[45] Date of Patent: Dec. 19, 2000

[54] METHOD OF ANODIZING A METAL ANODE PREPARED FROM VERY FINE METAL POWDER

[75] Inventors: John T. Kinard, Simpsonville; Brian I. Melody, Greer, both of S.C.

[73] Assignee: Kemet Electronics Corporation, Greenville, S.C.

[21] Appl. No.: 09/489,471

[22] Filed: Jan. 21, 2000

Related U.S. Application Data

[62] Division of application No. 09/143,373, Aug. 28, 1998.

[51] Int. Cl.[7] .................................................. C25D 11/26
[52] U.S. Cl. ......................... 205/318; 205/322; 205/332
[58] Field of Search .................................. 205/106, 107, 205/108, 318, 322, 332, 122

[56] References Cited

U.S. PATENT DOCUMENTS

| | | | |
|---|---|---|---|
| 3,180,809 | 4/1965 | Gregori | 205/171 |
| 3,359,191 | 12/1967 | Minami et al. | 205/171 |
| 3,496,424 | 2/1970 | Behrend | 361/524 |
| 3,563,863 | 2/1971 | Vierow | 205/138 |
| 3,796,644 | 3/1974 | Bernard | 205/332 |
| 3,943,041 | 3/1976 | Jackson | 205/152 |
| 4,196,060 | 4/1980 | Patrie et al. | 205/50 |
| 4,383,897 | 5/1983 | Gillich et al. | 101/459 |
| 4,388,156 | 6/1983 | Gillich et al. | 205/235 |
| 4,476,517 | 10/1984 | Fresia | 361/327 |
| 4,479,166 | 10/1984 | Finkelstein et al. | 361/506 |
| 4,781,802 | 11/1988 | Fresia | 205/171 |
| 4,823,236 | 4/1989 | Fresia | 361/506 |
| 5,111,365 | 5/1992 | Dapo | 361/506 |
| 5,211,741 | 5/1993 | Fife | 75/255 |
| 5,385,662 | 1/1995 | Kurze et al. | 205/316 |
| 5,560,761 | 10/1996 | Naito | 75/255 |
| 5,580,367 | 12/1996 | Fife | 75/255 |
| 5,587,871 | 12/1996 | Ue et al. | 361/504 |
| 5,605,561 | 2/1997 | Iwabuchi et al. | 75/364 |
| 5,687,057 | 11/1997 | Dapo | 361/506 |
| 5,716,511 | 2/1998 | Melody et al. | 205/324 |

FOREIGN PATENT DOCUMENTS 537474 6/1941 United Kingdom.

OTHER PUBLICATIONS

Melody et al., "An Improved Series of Electrolytes for Use in the Anodization of Tantalum Capacitor Anodes," Presented at the Capacitor and Resistor Technology Symposium (C.A.R.T.S. '92), Mar. 17, 1992, pp. 1–11.
Patent Abstracts of Japan, vol. 10, No. 373, Abs Grp No.: C391, Abstracting Appln. No. 60–8438, Dec. 1986.

Primary Examiner—Kathryn Gorgos
Assistant Examiner—William T. Leader
Attorney, Agent, or Firm—Banner & Witcoff, Ltd.

[57] ABSTRACT

Electrolytes containing water, at least one organic solvent, and at least one alkali metal phosphate salt can be used for anodizing valve metals prepared from metal powder having a surface area of at least 0.35 $m^2/g$ or 35,000 CV/g. The alkali metal phosphate salt should be relatively insoluble in the organic portion of the electrolyte, but highly soluble in a water solution of the organic solvent. The anodizing electrolytes have relatively high conductivity and are capable of being used at high anodizing currents. The anodic film produced by these electrolytes on valve metals is of substantially uniform thickness, has improved electrical parameters, and requires a shorter stabilization time at voltage.

12 Claims, 8 Drawing Sheets

METHOD OF ANODIZING A METAL ANODE PREPARED FROM VERY FINE METAL POWDER

This application is a division of Ser. No. 09/143,373 filed Aug. 28, 1998 pending.

FIELD OF THE INVENTION

The present invention is directed to electrolytes suitable for anodizing valve metal anodes prepared from fine powders, to methods of preparing capacitors, and to capacitors prepared with fine powder anodes and suitable electrolytes.

BACKGROUND OF THE INVENTION

Since their development in the 1950's, the use of solid tantalum capacitors having high volumetric efficiency and reliability has increased to the current world market of several billion solid tantalum capacitors per year. The market continues to demand reliable capacitors with even higher volumetric efficiency and more restrictive parameters (e.g., lower equivalent series resistance, lower direct current leakage, etc.) at lower costs.

The electrochemical anodizing processes in use today for the manufacture of powder metallurgy tantalum capacitors typically employ electrolytes containing water, ethylene glycol or polyethylene glycol, and phosphoric acid. The resistivities of these electrolytes are usually excessively high for low voltage anodizing of anodes fabricated from high surface area metal powders (surface area is greater than 35,000 microfarad-volts/g) unless the phosphoric acid content exceeds approximately 1 vol. %. The relatively high percentage of phosphoric acid in protic acid solutions (i.e., water and glycols or polyglycols) results in relatively low pH values (e.g., pH less than about 2) and limited electrolyte life due to buildup of corrosion products in the electrolyte as well as the limited current carrying capability of the electrolyte due to precipitation of phosphate residues in the smaller pores of the powder metallurgy anode bodies fabricated from valve metal powders.

British patent G.B. 2 168 383 describes the use of amine phosphate salts, soluble both in organic solvents and water for use in anodizing electrolytes. Unfortunately, the amines which form soluble phosphate salts (e.g., tri-N-propyl amine, pyridine, and substituted pyridines) tend to be toxic and volatile at standard anodizing temperatures (from about 80° to about 90° C.). Additionally, these amines form incompletely ionized phosphate salts resulting in lower electrolyte conductivities than phosphoric acid alone.

U.S. Pat. No. 5,716,511 describes the use of phosphoric acid or acid phosphate salts in electrolytes containing up to 75 vol. % polyethylene glycol dimethyl ether for the anodizing of tantalum powder metallurgy anodes at temperatures below about 50° C. in order to reduce the incidence of blister-like oxide flaws in higher voltage (above 100 anodizing volts) films formed over mechanically damaged tantalum surfaces.

As the surface area of the metal powder used for capacitor anodes has increased above about 0.35 square meters per gram (35,000 microfarad-volts per gram), the stabilization time required at voltage to obtain uniform oxide thickness has steadily increased due to voltage drop through the fine pores of the anode. Additionally, acidic phosphate-containing electrolytes leave increasingly obtrusive phosphate residues in the fine anode pores as the surface area of the powder has increased over the years. The required stabilization time at voltage and the accumulation of phosphate residues in the fine pores of anodes are further aggravated as the size of the anode bodies is increased.

SUMMARY OF THE INVENTION

The present invention addresses the above-described shortcomings of traditional anodizing electrolytes in preparing capacitors from anodes made from fine metal powders.

The present invention is directed to a capacitor prepared from a fine metal powder anode, wherein the surface area of the fine metal powder is greater than 0.35 m$^2$/g. The capacitor is prepared by anodizing the fine metal powder electrode using an electrolytic solution comprising at least one alkali metal phosphate salt, water, and at least one organic solvent.

The electrolytic solution preferably contains one or more glycols, polyethylene glycols, polyethylene glycol monomethyl ethers, or polyethylene dimethyl ethers. In addition, the present invention is directed to an electrolytic solution where the sum of the alkali metal phosphate salts is less than about 10 wt. % of the total electrolytic solution weight.

The present invention is also directed to a method of anodizing a fine metal powder anode where a film is formed on the fine metal powder anode using the above-described electrolytic solution. The fine metal powder is preferably a valve metal powder, such as tantalum, having a surface area greater than 0.35 m$^2$/g. The film is formed at a temperature of from about 60° C. to about 100° C.

The electrolytes of the current invention, in contrast to electrolytes of the prior art, provides a reduction in the deposition of metallic phosphates/polyphosphoric acid in the fine anode pores. This results in more uniform and higher capacitance combined with a lower dissipation factor when anodizing powder metallurgy anodes fabricated from high surface area metal powder.

It is to be understood that both the foregoing general description and the following detailed description are exemplary and explanatory only and are not restrictive of the present invention as claimed.

DETAILED DESCRIPTION OF THE PREFERRED EMBODIMENTS

Figure 1:
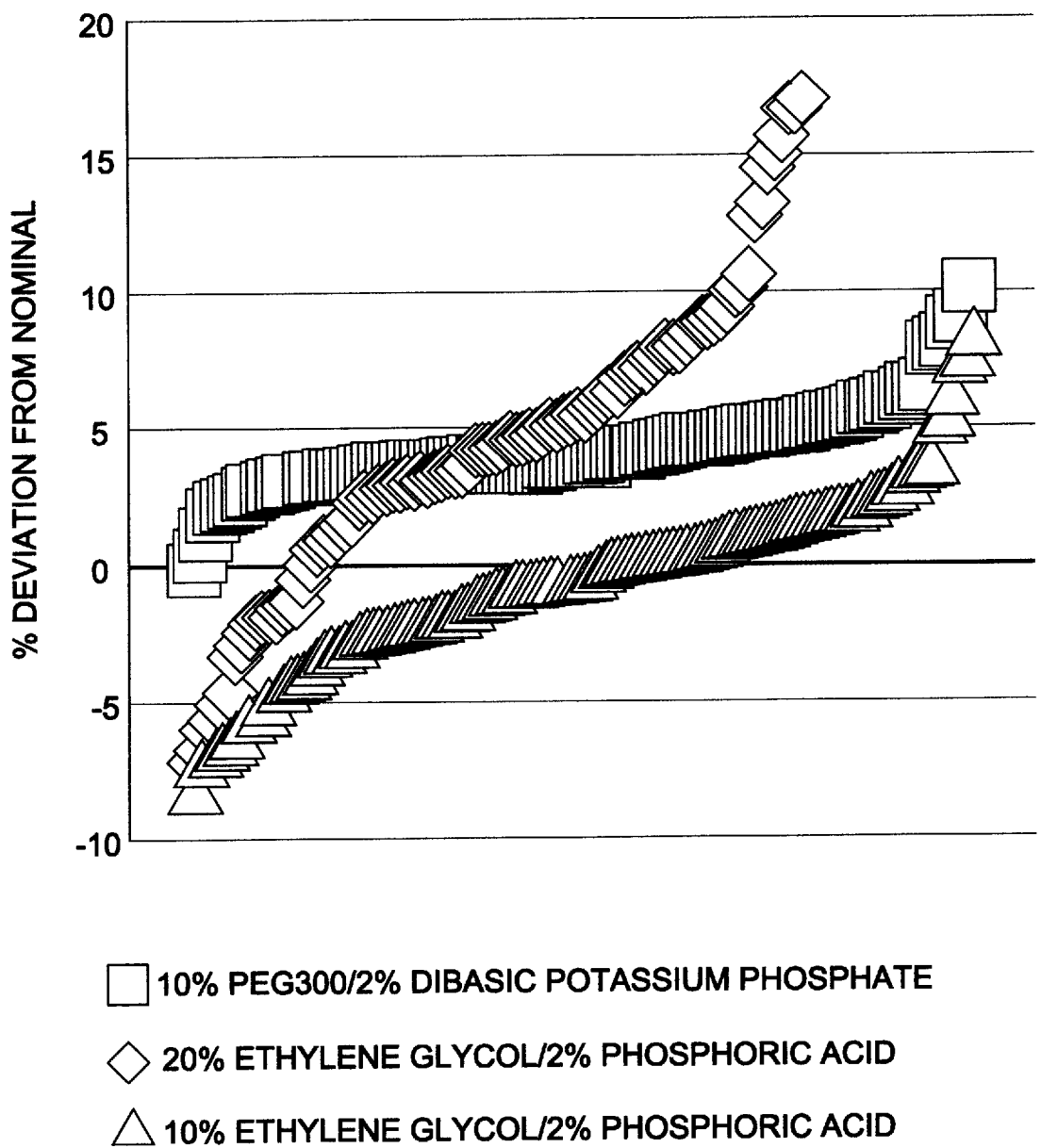
FIG. 1 is the capacitance values for capacitors described in Example 4.

It is desirable to fabricate powder metallurgy capacitor anodes at as high a density as possible in order to achieve maximum capacitance for a given device volume and rated voltage (i.e., maximum volumetric efficiency). However, the use of prior art electrolytes in the anodizing of capacitor anodes fabricated from high surface area metal powders results in an increased precipitation of phosphate solids in the fine pores of the anode as either the anode density or metal powder surface area increased. These precipitated phosphate solids remained in the anode pores following anodizing, thereby, impeding both uniform anodic oxide formation and contact with counter-electrode materials (e.g., manganese dioxide). The effects of this impedance includes loss of potential capacitance in addition to an increased dissipation factor and an increased current leakage.

A major improvement realized with the electrolytes of the current invention when compared to electrolytes of the prior art is a reduction in the deposition of metallic phosphates/polyphosphoric acid in the fine anode pores. This results in more uniform and higher capacitance combined with a lower dissipation factor when anodizing powder metallurgy anodes fabricated from high surface area metal powder. High surface area powder is defined as powder having at least 0.35 $m^2/g$ or 35,000 CV/g, preferably at least 0.5 $m^2/g$ or 50,000 CV/g.

The electrolytic solution of the present invention employs alkali metal phosphate salts in combination with water and an organic solvent to give an alkaline or neutral electrolyte solution. The alkali metal phosphate salt and organic solvent should be selected such that the salt is substantially insoluble in the organic solvent but relatively highly soluble in the water/organic solvent solution. In accordance with the present invention, a capacitor is prepared by anodizing a fine metal powder electrode using an electrolytic solution.

The alkali metal phosphate salt is insoluble in the organic solvent, but soluble in the solution of water and organic solvent. The alkali metal phosphate salt is preferably a water soluble dibasic salt, such as dibasic potassium phosphate and dibasic sodium phosphate, most preferably dibasic potassium phosphate. The amount of alkali metal phosphate salt is preferably from about 0.1 wt % to about 10 wt. % of the total weight of the electrolytic solution. Preferably, it is from about 0.5 wt. % to about 5 wt. % of the total weight of the electrolytic solution. More preferably it is from about 0.5 wt. % to about 2.5 wt. % of the total weight of the electrolytic solution.

The organic solvent is preferably at least one solvent selected from glycols, polyethylene glycols, polyethylene glycol monomethyl ethers, or polyethylene dimethyl ethers. The amount of organic solvent should be less than the solubility limit of the organic solvent in water. The organic solvent should be above about 1 vol % and less than about 50 vol % of the electrolytic solution. Preferably, the organic solvent is from about 5 vol. % to about 35 vol % of the electrolytic solution. More preferably, the organic solvent is from about 5 vol. % to about 25 vol % of the electrolytic solution.

It is believed, but applicants do not want to be bound by any particular theory, that as the internal anode temperature rises due to the heat produced from the anodizing reaction, the electrolyte of the current invention phase separates into a water phase and an organic phase. During this phase separation, the water phase retains the alkali metal phosphate, since the alkali metal phosphate is insoluble in the organic phase. The insolubility of the phosphate salt(s) in the organic solvent alone provides an automatic limit to internal heating of the anode bodies during anodizing due to the reduced conductivity of the electrolyte under desiccating conditions such as occur in the interior of the anodes at high current densities.

Due to this phase separation, the resistivity of the electrolyte solution also increases thus slowing down the anodizing reaction and cooling the electrolyte solution. The now cooled electrolyte solution becomes one phase again as the water phase condenses back into the organic phase and the rate of the anodizing reaction is increased.

The neutral or slightly basic electrolyte pH of the present invention results in enhanced resistance to the precipitation of acidic polyphosphates in fine anode pores that are formed during desiccation of phosphoric acid. The near neutral pH also results in a generally lower rate of anodizing tank corrosion and metals pick-up by the electrolyte. The pH is preferably about 7 to 9, more preferably about 7.

The high degree of ionization of alkali metal phosphates in solution gives rise to electrolytes having a higher conductivity than traditional electrolytes. This high conductivity reduces the stabilization time at voltage required for anodizing high surface area metal powders.

The benefit of the current invention over the prior art in this respect is that the alkali metal phosphate does not form a viscous mixture with the organic phase as does the phosphoric acid of the prior art electrolytes. The viscous mixture formed by the prior art electrolytes plugs the fine pores of the valve metal powder. Additionally, this viscous mixture does not merge into a single phase once the water condenses due to cooling from a reduced rate of the anodizing reaction. Therefore, the fine pores of the valve metal continue to be blocked and are minimally anodized. This reduced anodizing of the fine pores reduces the capacitance of the resulting capacitor.

The present invention is further directed to a method of anodizing a metal whereby a film is formed on a metal with the electrolytic solution described above. The metal is preferably a valve metal such as tantalum or niobium.

EXAMPLE

The invention will be further described by reference to the following examples. These examples should not be construed in any way as limiting the invention.

Example 1

Two groups of anodes (330 microfarads/10 volts) were anodized to 32 volts at 80° C. The first of these groups used a conventional electrolyte, while the second group used an electrolyte of the present invention. Table 1 provides the composition of the electrolytes. The anodes were rinsed, heat-treated at 375° C. for 30 minutes, and re-anodized in the original electrolytes. The anodes were then processed to silver-painted capacitor bodies, attached to lead frames, and molded into surface mount finished capacitors using known techniques.

A comparison of the two anodes is provided in Table 1 where it was observed that the stabillzation time for the electrolyte of the present invention is one-half that of the stabiliation time of a traditional electrolyte. The values of capacitance stability was greater and the values for the dissipation factor (DF) and leakage current were greatly reduced for the electrolyte of the present invention as compared to the values of the traditional electrolyte. Finally, the porosimetry data for the anodes indicates that the anodized anodes have fewer of the finest pores when anodized in the electrolyte of the present invention. Although not wanting to be bound by any particular theory, a possible explanation for the fewer finer pores is the reduced deposition of phosphate solids within the pores of the anode under high pH conditions.

TABLE 1

Comparison between a Traditional Electrolyte and an Electrolyte of the Current Invention

|  | Traditional Electrolyte | Electrolyte - Current Invention |
|---|---|---|
| Electrolyte | 23 vol. % ethylene glycol, 2 vol. % phosphoric acid | 10 vol. % polyethylene glycol 300, 2 wt. % dibasic potassium phosphate |
| 1 kHz Resistivity (ohm-cm at 80° C.) | 100 | 35 |
| Current Density (microamps/micro farad-volt) | 1.5 | 3.0 |
| Stabilization Time | 5 hours for the first anodizing | 3 hours for the first anodizing |
| Electricals at Silver Paint | 120 Hz Cap. = 365 μF<br>120 Hz DF = 7.42%<br>100 kHz ESR = 0.050 ohms<br>D.C. Leakage = 11.79 μA | 120 Hz Cap. = 326 μF<br>120 Hz DF = 3.74%<br>100 kHz ESR = 0.061 ohms<br>D.C. Leakage = 4.47 μA |
| Electricals after Molding | 120 Hz Cap. = 261 μF<br>120 Hz DF = 6.04%<br>100 kHz ESR = 0.058 ohms<br>D.C. Leakage = 15.96 μA | 120 Hz Cap. = 321 μF<br>120 Hz DF = 3.60%<br>100 kHz ESR = 0.055 ohms<br>D.C. Leakage = 7.34 μA |

Example 2

Extremely low corrosion and metal pick-up rates observed with the electrolytes of the present invention were illustrated by the metal analysis of an electrolyte (10 vol. % polyethylene glycol 300/2 wt. % $K_2HPO_4$) which had been in service in a stainless steel anodizing tank for a period of six (6) months (over 4,000+hours). The metal content was analyzed using ICP (inductively coupled plasma spectrophotometer) and resulted in metal contents of.

Chromium=less than 0.012 parts per million (ppm)

Iron=0.010 ppm

Nickel=less than 0.070 ppm

Aluminum=0.190 ppm Typical metal content values for a traditional electrolyte after only about 500 hours of service are:

Chromium=greater than 5 ppm

Iron=greater than 15 ppm

Nickel=greater than 5 ppm

Aluminum=from about at least 30 ppm to greater than about 100 ppm.

The extremely high aluminum content in the traditional electrolyte was due to contact between the electrolyte and the aluminum bars used to support the anodes for anodizing. In order to more directly test the metal pick-up of the electrolyte of the current invention, an aluminum anode process bar was placed in the electrolyte at 80° C. After 3 days the aluminum content of the electrolyte was found to be 0.39 ppm, and after 12 days, 0.76 ppm. In a traditional acidic electrolyte having the same volume, dissolution of an aluminum anode process bar requires about 24 hours and brings the aluminum content to about 300 ppm.

Example 3

The applicability of the claimed electrolyte to valve metals in addition to tantalum is illustrated by the performance of high s area niobium powder anodes anodized to 20 volts at 80° C. in a near neutral pH electrolyte (10 vol. % polyethylene glycol 300/2 wt. % $K_2PO_4$) as compared to high surface area niobium powder anodes anodized to 20 volts at 80° C. in a dilute aqueous phosphoric acid. Clearly, as can be seen below in Table 2, the electrolyte of the present invention gave superior performance with respect to both capacitance and current leakage with niobium anodes when compared to traditional electrolyte solutions.

TABLE 2

Comparison between Traditional Electrolytes and the Electrolyte of the Claimed Invention on Niobium Anodes

|  | Sinter Temperature (° C.) | Mean Capacitance (μF) | Mean D.C. Leakage (μA) | Mean nA/CV |
|---|---|---|---|---|
| ~100 ohm-cm | 1250 | 362.7 | 14.2 | 2.0 |
| Aqueous $H_3PO_4$ | 1300 | 236.8 | 6.9 | 1.5 |
| Electrolyte | 1350 | 133.6 | 2.5 | 0.9 |
| ~350 ohm-cm | 1250 | 264.7 | 12.1 | 2.3 |
| Aqueous $H_3PO_4$ | 1300 | 166.3 | 10.9 | 3.2 |
| Electrolyte | 1350 | 83.7 | 2.1 | 1.3 |
| ~35 ohm-cm | 1250 | 725.9 | 9.2 | 0.7 |
| Organic $K_2PO_4$ | 1300 | 718.8 | 2.3 | 0.1 |
| Electrolyte | 1350 | 309.0 | 1.1 | 0.2 |

Note:
D.C. leakage measured at 14 volts after 60 seconds of charge time
nA/CV = nanoamps/CV = $10^{-9}$ Amp/microfarad · volts

Example 4

A batch of anodes were fabricated from commercially available high surface area (50,000 CV/g or one-half square meter per gram) tantalum powders with a rating of 470 microfarads/10 volts. The anodes were then divided into three groups and anodized to 32.5 volts at 80° C., at a current density of about 1.5 microamperes per microcoulomb.

The first group was anodized using a conventional electrolyte consisting of about 20 vol. % ethylene glycol and 2 vol. % phosphoric acid. The second group was anodized using an electrolyte consisting of about 10 vol. % ethylene glycol 300 and about 2 wt. % dibasic potassium phosphate. In order to confirm that the improvement in Example 1, with the electrolyte of the present invention, was due to the use of the metal phosphate salt and not due to the lower organic content of the electrolyte, a third group was anodized in a reduced organic content conventional electrolyte consisting of about 10 vol. % ethylene glycol and about 2 vol. % phosphoric acid.

The anodes of all three groups were then processed to silver-painted capacitor bodies, attached to the lead frames, and molded into finished surface mount capacitors by known methods. The electrical parameters were then measured after molding without any further electrical screening in order to ascertain the inherent uniformity and stability (e.g., resistance of the capacitors to molding stress, etc.) of the electroprocessed anodes.

FIG. 1 is a graph of capacitance values for a random sample of capacitors from each of the three groups, expressed as percent deviation from the nominal 470 microrfarad capacitance value. The electrolyte of the claimed invention had a much more uniform capacitance value than either of the above-described electrolytes.

Figure 2:
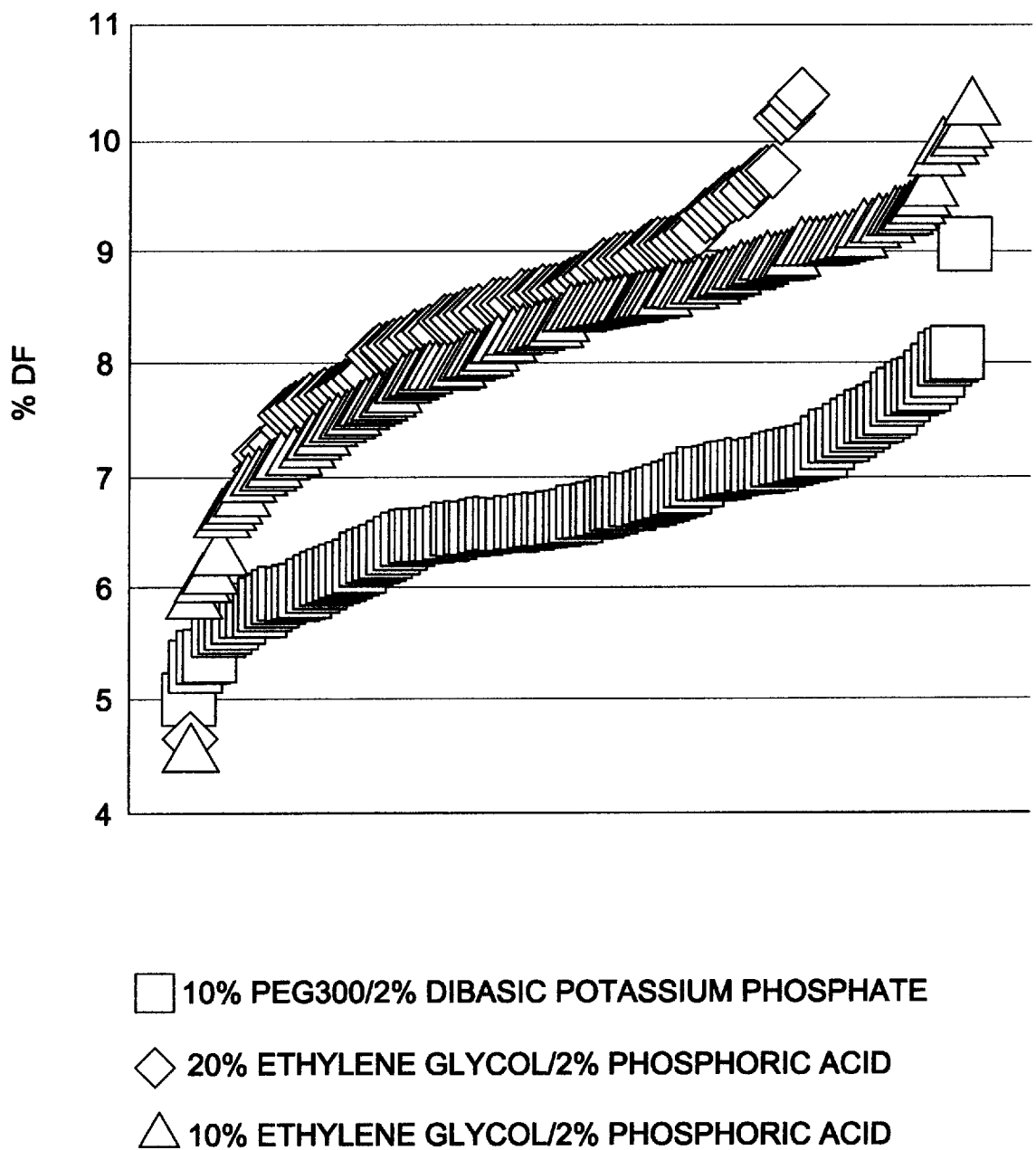
FIG. 2 is the dissipation factor (DF) values for capacitors described in Example 4.

FIG. 2 is a graph of dissipation factor (DF) values, expressed as % DF, for a random sample of capacitors from each of the three groups. With the electrolyte of the current invention, the DF is found to be significantly lower than with the electrodes containing phosphoric acid, regardless of the ethylene glycol content.

Figure 3:
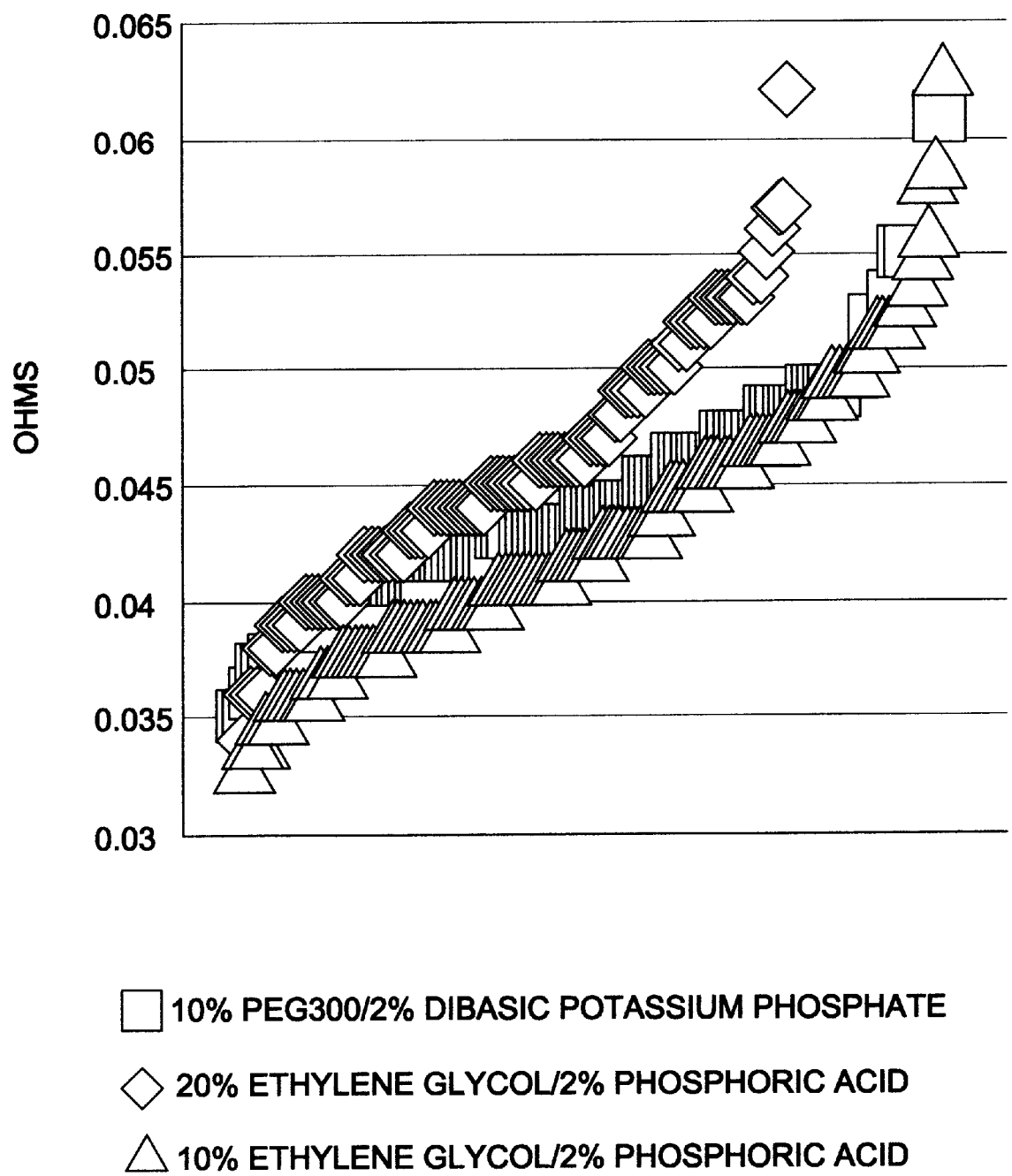
FIG. 3 is the equivalent series resistance (ESR) values for capacitors described in Example 4.

FIG. 3 is a graph of the equivalent series resistance (ESR), expressed in ohms, for a random sample of each group of capacitors. The ESR values for the capacitors from all three groups are substantially similar.

Figure 4:
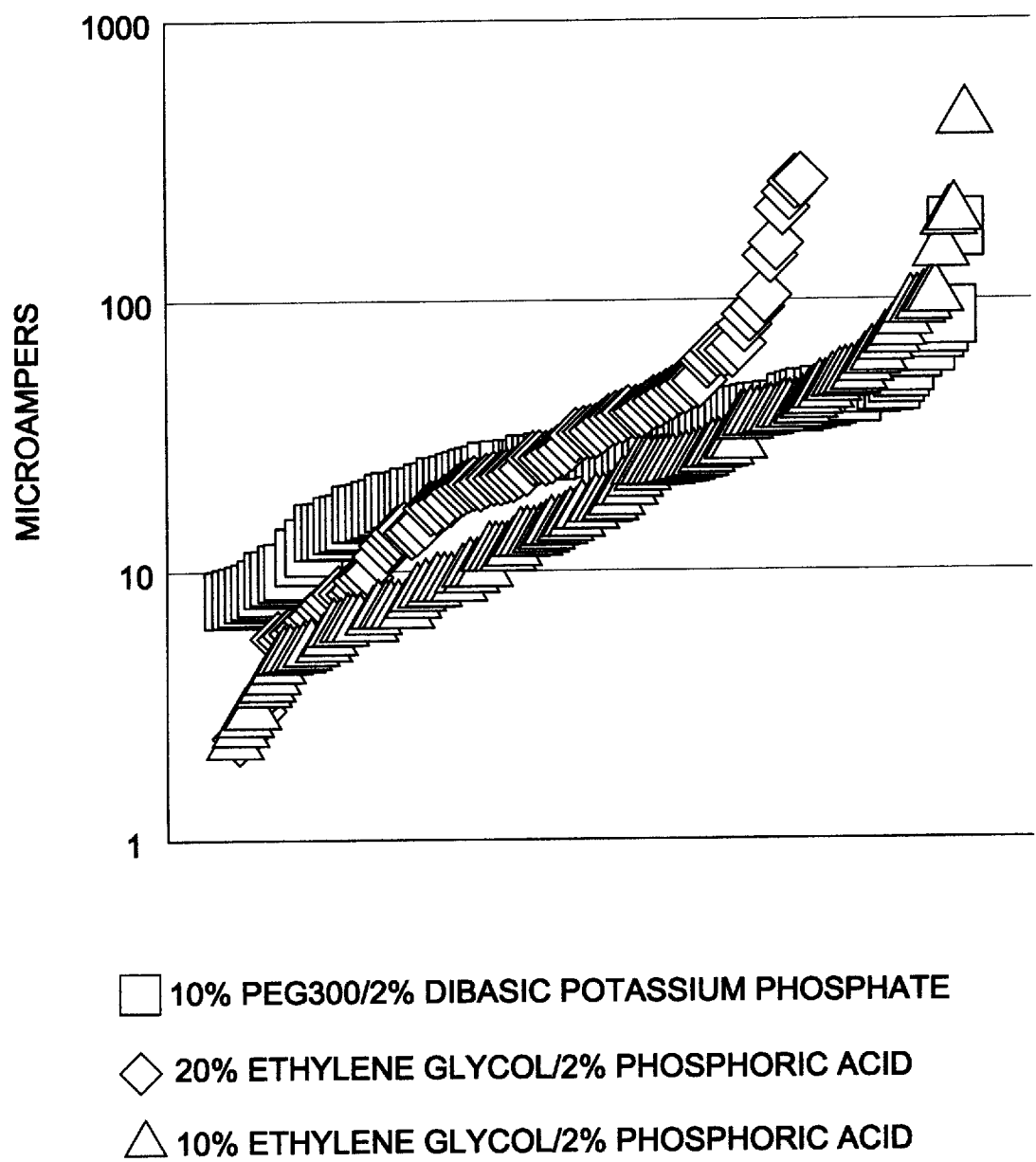
FIG. 4 is the current leakage values for capacitors described in Example 4.
Figure 5:
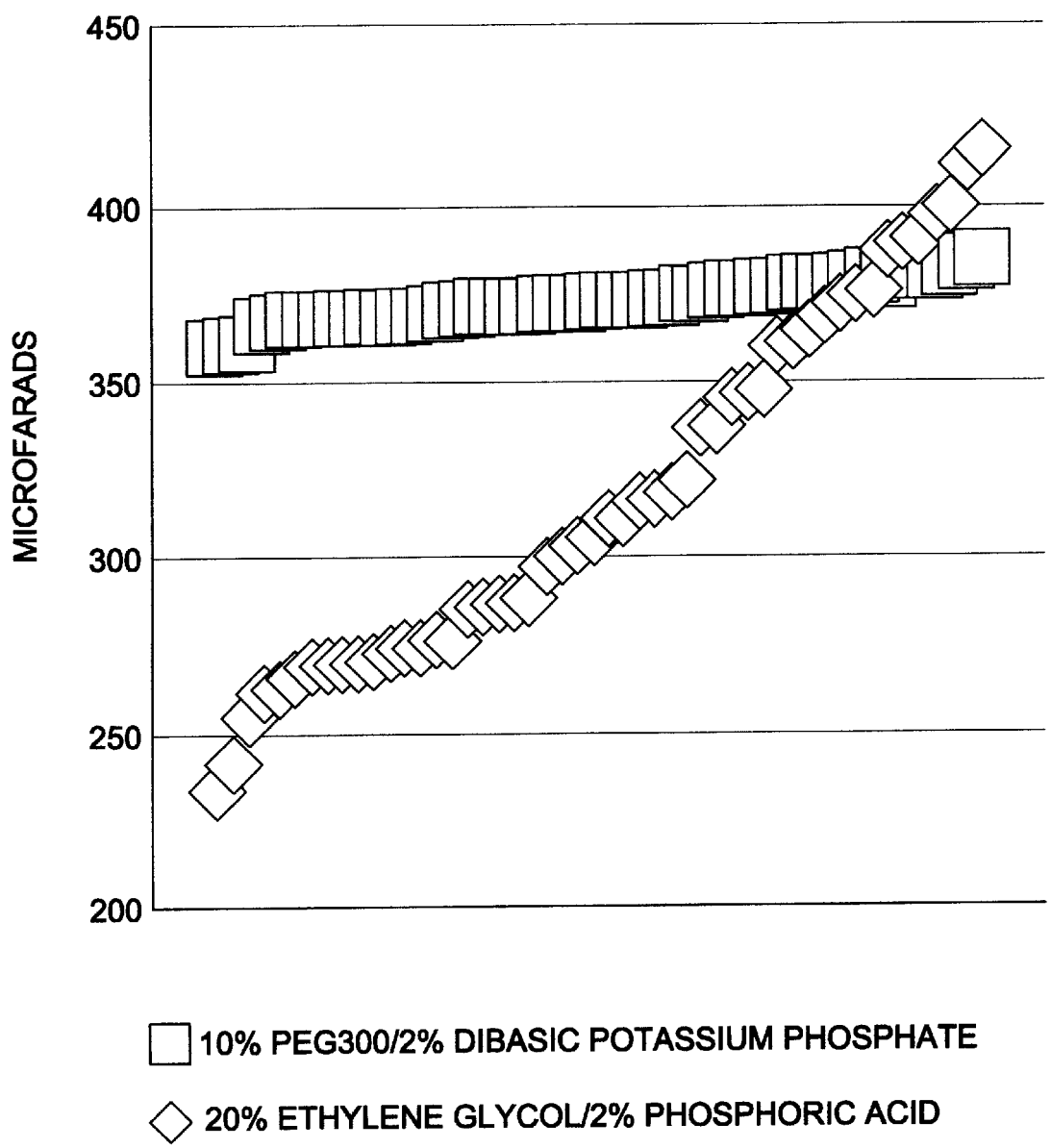
FIG. 5 is the capacitance values for capacitors described in Example 5.
Figure 6:
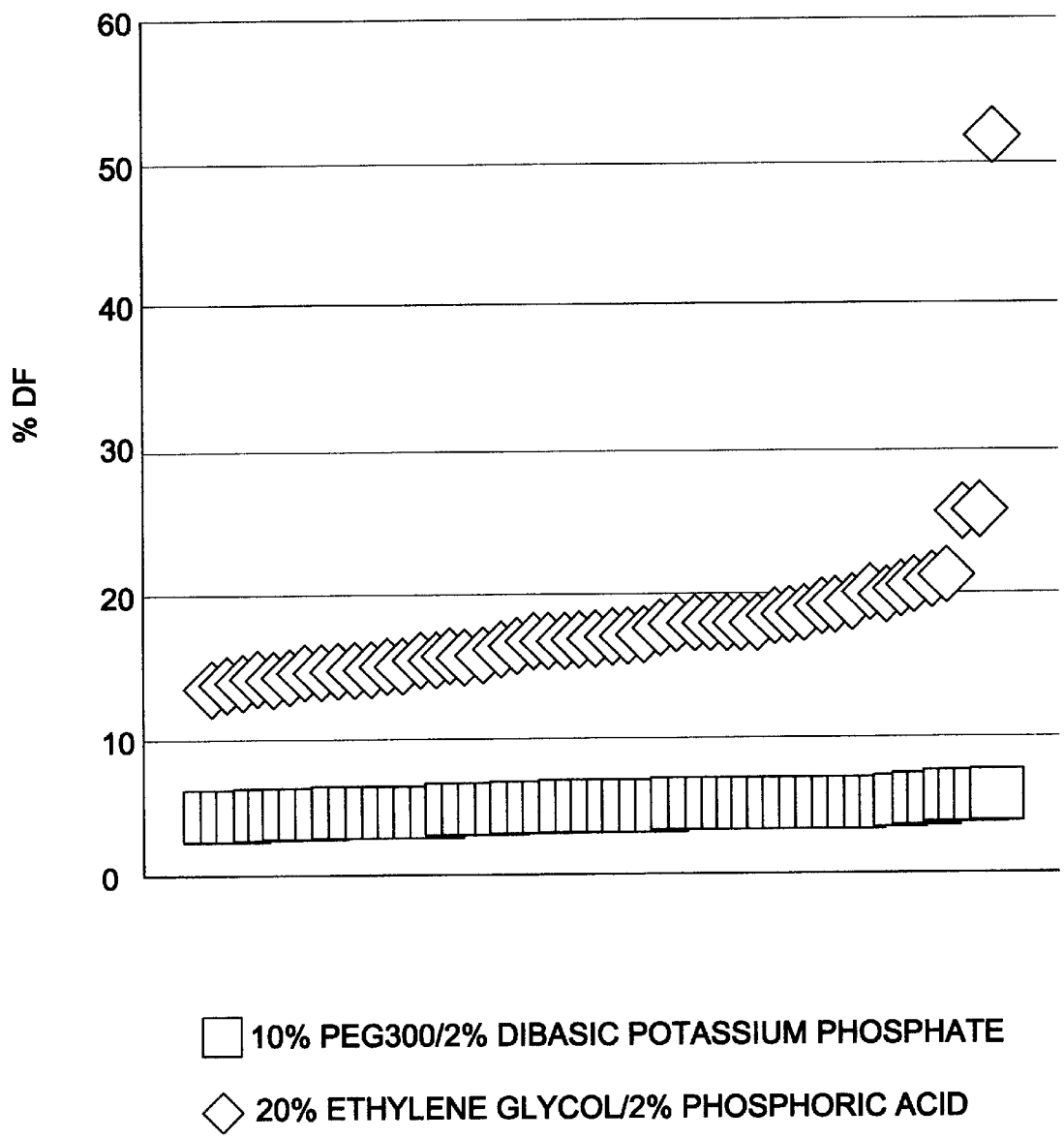
FIG. 6 is the dissipation factor values for capacitors described in Example 5.
Figure 7:
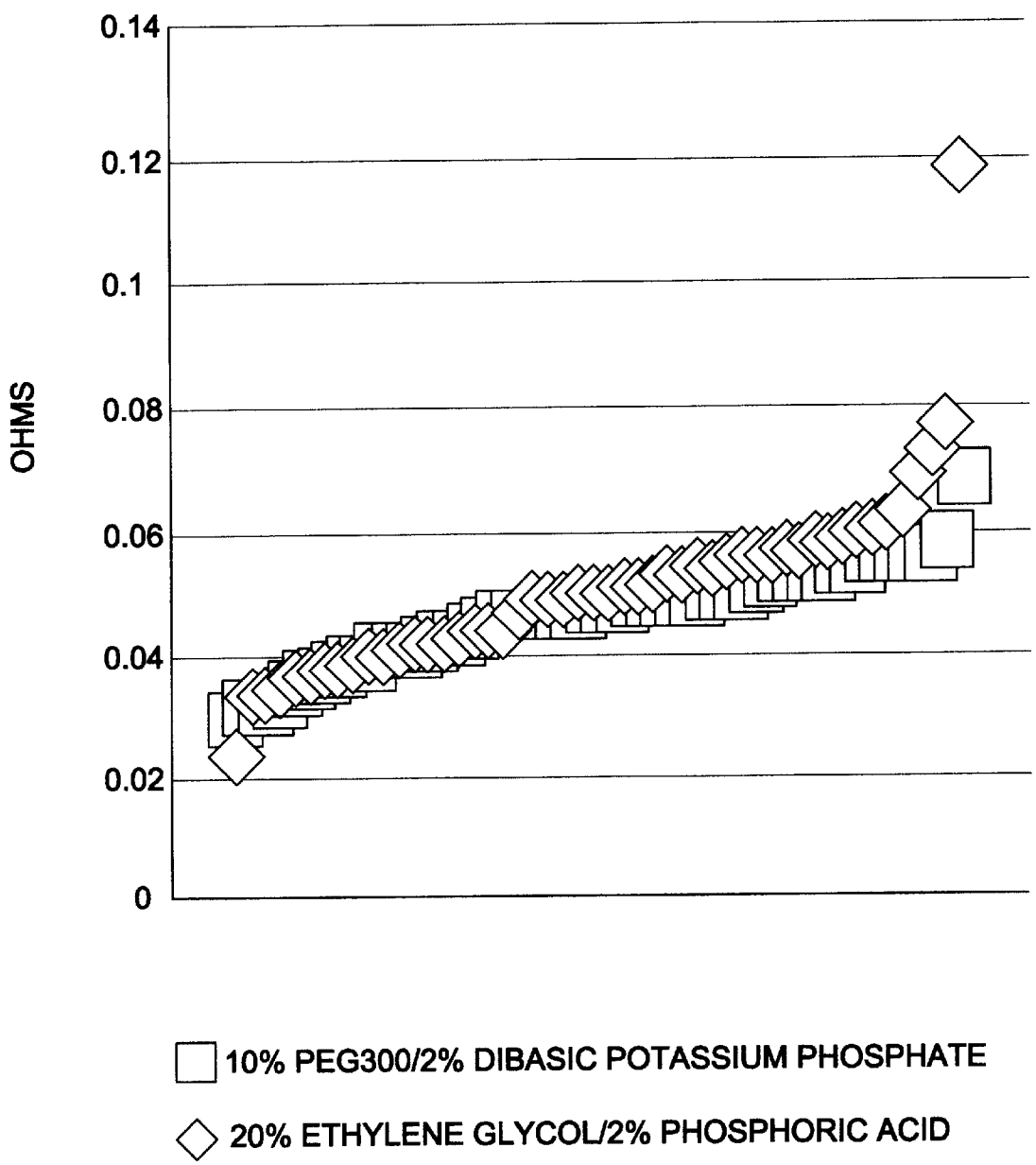
FIG. 7 is the ESR values for capacitors described in Example 5.
Figure 8:
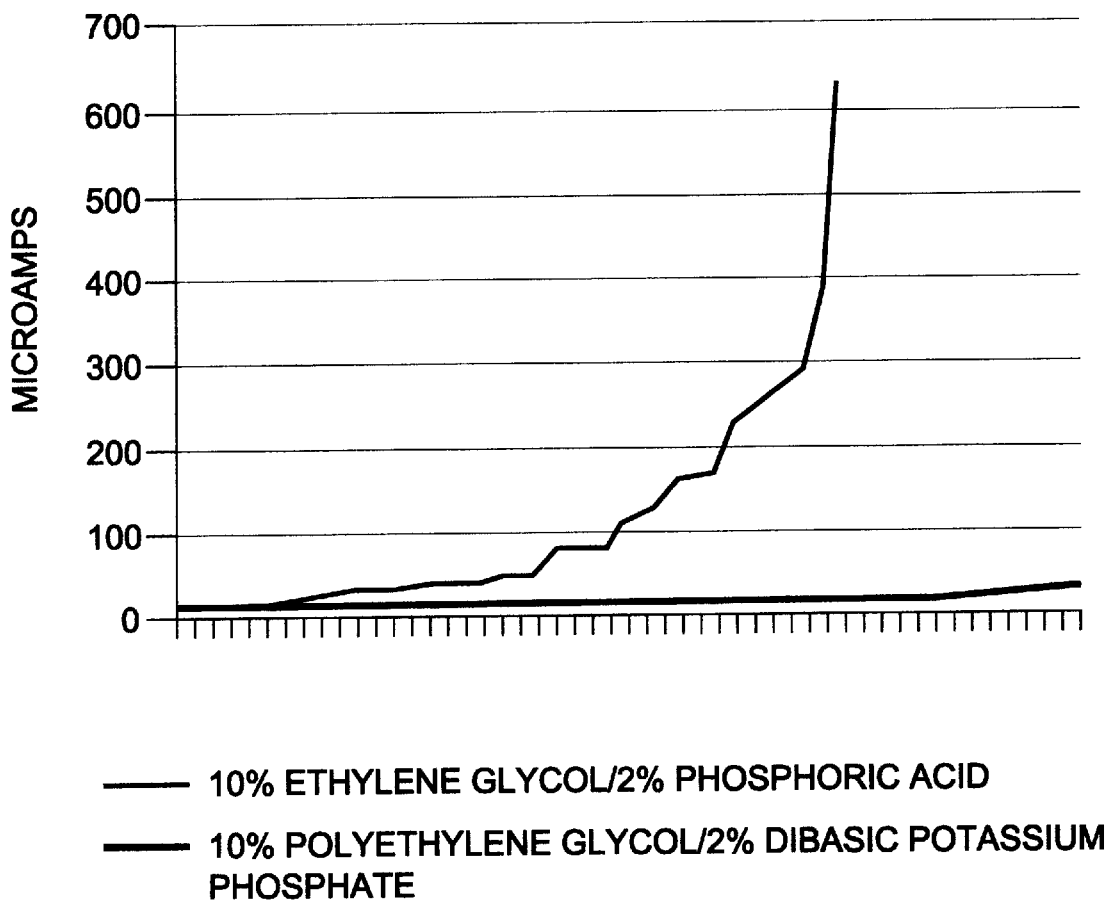
FIG. 8 is the current leakage values for capacitors described in Example 5.

FIG. 4 is a graph of the leakage current values, expressed in microamperes, for a random sample of capacitors from each of the three groups. The leakage current is substantially similar for all three groups.

Example 5

A batch of anodes rated at 375 microfarads/10 volts, were fabricated at a density of 6.0 g/cm$^3$, from commercially available high surface area tantalum powder (with a CV of about 50,000 microfarad-volts/g or 0.5 m$^2$/g). The anodes were then split into two groups and anodized to 32 volts at 80° C. The first group was anodized with a conventional electrolyte containing 20 vol. % ethylene glycol and 2 vol. % phosphoric acid. The second group was anodized with an electrolyte of the current invention (10 vol. % polyethylene glycol 300 and 2 wt. % dibasic potassium phosphate). Both groups were then further processed, by methods known to those of ordinary skill in the art of capacitor manufacturing, to manganese dioxide impregnated, graphite and silver paint-coated capacitor bodies.

The capacitance, dissipation factor (DF), equivalent series resistance (ESR), and leakage current values for both groups are shown in FIGS. 5, 6, 7, and 8. The capacitance was found to be an average 17% higher for capacitors anodized using the electrolyte of the claimed invention. The DF was found to about four times as high for the capacitors anodized with the conventional electrolyte as compared to the capacitors anodized with the electrolyte of the current invention. The ESR for both groups was substantially similar, but the leakage current for capacitors anodized with traditional electrolytes was about 300 times higher then the leakage current for capacitors anodized with the electrolyte of the current invention.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method of anodizing a metal anode prepared from metal powder having a surface area of least 0.35 m$^2$/g or 35,000 CV/g, comprising anodizing the metal anode with an electrolyte comprising at least one alkali metal phosphate salt, water and at least one organic solvent wherein the alkali metal phosphate salt is insoluble in the organic solvent alone but soluble in a solution of the water and the organic solvent, wherein the total volume of organic solvent is above about 1 vol % and less than 50 vol. % of the total electrolytic solution volume, and wherein the anode is anodize at a temperature from about 60° C. to about 100° C.

2. The method according to claim 1 wherein said metal is a valve metal.

3. The method according to claim 2 wherein said valve metal is tantalum.

4. The method according to claim 2 wherein said valve metal is niobium.

5. The method according to claim 1 wherein said organic solvent is selected from the group consisting of polyethylene glycol, polyethylene glycol monomethyl ether, polyethylene dimethyl ether, and mixtures thereof.

6. The method according to claim 1 wherein said organic solvent is selected from the group consisting of glycols.

7. The method according to claim 1 wherein the alkali metal phosphate salt is dibasic potassium phosphate.

8. The method according to claim 1 wherein the total weight of the alkali metal phosphate salt is between about 0.1 wt % and about 10 wt. % of the total weight of the electrolytic solution.

9. The method according to claim 8 wherein the total weight of the alkali metal phosphate salt is from about 0.5 wt. % to about 5 wt. % of the total weight of the electrolytic solution.

10. The method according to claim 9 wherein the total weight of the alkali metal phosphate salt is from about 0.5 wt. % to about 2.5 wt. % of the total weight of the electrolytic solution.

11. The method according to claim 1 wherein the total volume of the organic solvent is from about 5 vol. % to about 35 vol. % of the total electrolytic solution volume.

12. The method according to claim 11 wherein the total volume of the organic solvent is from about 5 vol. % to about 25 vol. % of the total electrolytic solution volume.

* * * * *